Feb. 13, 1940.  C. L. GOLDAMMER  2,190,449
ARTIFICIAL FISH BAIT
Filed June 3, 1938  2 Sheets-Sheet 1

INVENTOR.
Clarence L. Goldammer
BY John W. Michael
ATTORNEY.

Feb. 13, 1940.   C. L. GOLDAMMER   2,190,449
ARTIFICIAL FISH BAIT
Filed June 3, 1938   2 Sheets-Sheet 2
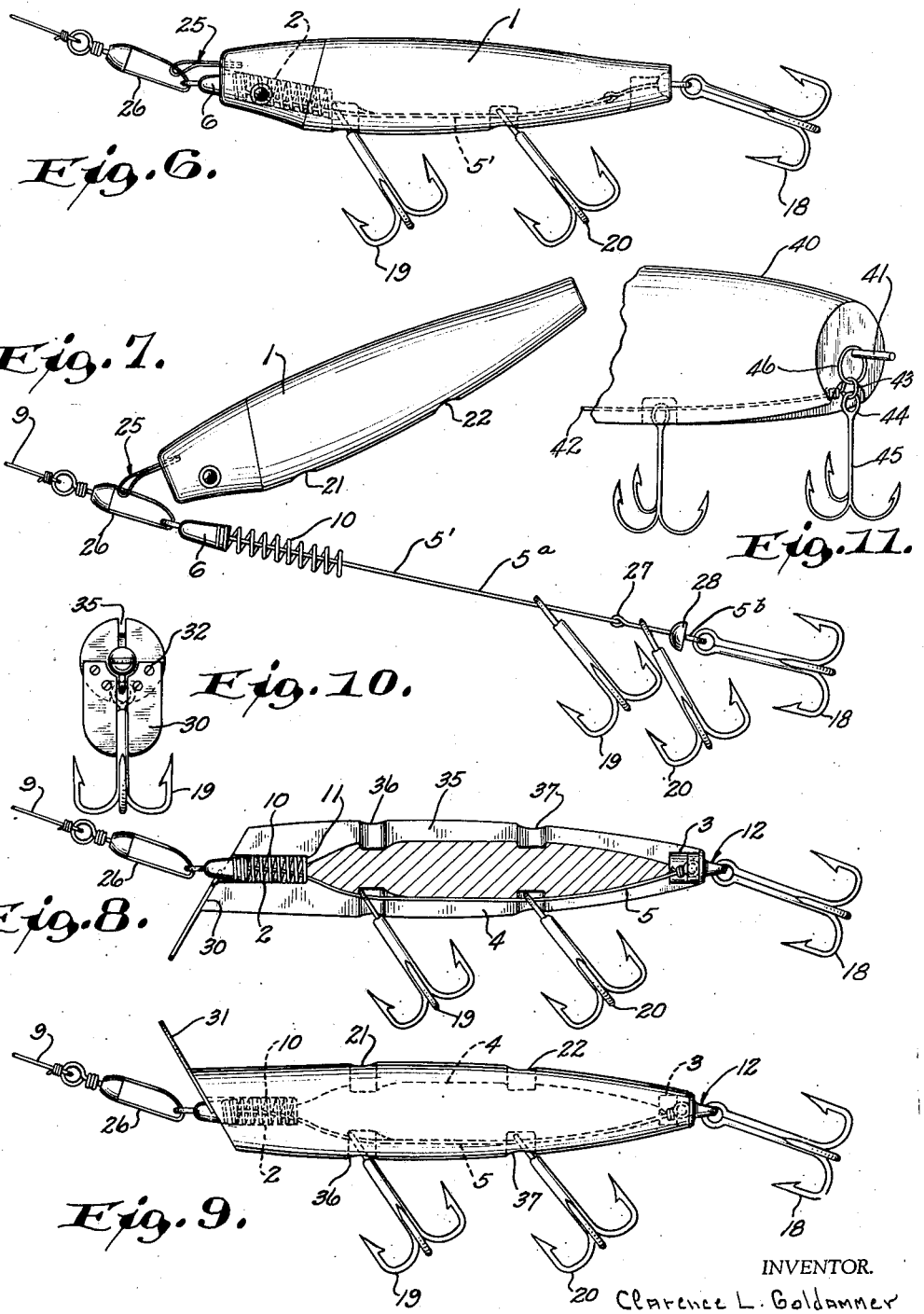
INVENTOR.
Clarence L. Goldammer
BY John W. Michael
ATTORNEY.

Patented Feb. 13, 1940

2,190,449

UNITED STATES PATENT OFFICE 2,190,449

ARTIFICIAL FISH BAIT

Clarence L. Goldammer, Milwaukee, Wis.

Application June 3, 1938, Serial No. 211,485

14 Claims. (Cl. 43—46)

This invention relates to an improvement in artificial fish baits of the type wherein the plug or body of the bait and the hook or hooks separate automatically when the fish strikes to preclude the plug or body from being of any assistance to the fish in its struggle to free itself from the hook or hooks.

One of the principal objects of the present invention is to provide an artificial bait of this character which is simple and durable in construction, reliable and highly efficient in use, easy and comparatively inexpensive to manufacture, and convenient to handle and pack.

The invention lends itself to embodiment in a variety of types of baits or lures and permits of the desirable and normal association or relationship between the hooks and the plug or body of the bait although insuring automatic disengagement and separation of the hooks from the plug or body when the strike is made.

In several embodiments of the invention, the plug or body of the bait, which may be shaped, colored and designed as desired, is provided at its front and rear ends with axially opening sockets connected by a slot extending longitudinally of the underside of the plug or body. A leader wire is extended through the slot and terminates at its ends in the sockets. On the forward end of the leader wire a head and eye is secured which provides for the attachment of the leader wire to the fish line and also presents an abutment for a spring interposed between the head and the inner end of the socket. To the rear of the leader wire a connector is fastened which is flanged or otherwise adapted for interfitting with the rear socket and also has an eye for interengagement with a hook disposed at the rear end of the bait. A plurality of additional hooks are slidably mounted on intermediate portions of the lead wire and have their eyes received in notches which intersect the slot in the plug or body.

With such an arrangement, when a fish strikes any one of the hooks, the leader wire is flexed downwardly and rearwardly with the result that the spring is compressed and the connector at the rear disengaged to free the leader wire and its hooks from the plug or body which floats to the surface. If any one of the forward hooks are struck the same result ensues although such hooks slide rearwardly on the leader wire as an incident to the action. If desired, the plug or body may be flexibly interconnected with the fishing line so that while it separates from the hook tackle it will still remain attached to the line. This is desirable when fishing in fast running water.

In addition to the foregoing it may be desirable in many instances to provide a jointed leader wire so that the full impact of the strike will be taken on the short, freely pivoted, rear end of the leader wire, thereby relieving the leader wire of any excessive transverse strain or bending.

The bait also lends itself for embodiment in that type which is adapted either for surface fishing or for deep diving bait by suitably fashioning the head of the plug or bait and duplicating the slot and notch structure on the upper side of the head or plug.

In lieu of a socket at the rear end of the plug with which a connector coacts the invention also proposes the provision of a rearwardly projecting pin on the unsocketed rear end of a suitable body or plug with which a ring interengaged with the connection between the rear hook and the rear end of the leader wire is detachably engageable, the construction being otherwise the same.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 6 is a vew in side elevation of another embodiment of the invention;

Figure 7 is a similar view showing the structure illustrated in Figure 6 but after a strike has been made;

Figure 8 is a view in central vertical longitudinal section showing still another embodiment of the invention;

Figure 9 is a view in side elevation of the embodiment illustrated in Figure 8;

Figure 10 is a view thereof in front elevation; and

Figure 11 is a fragmentary perspective view showing another embodiment of the invention.

Figure 1:
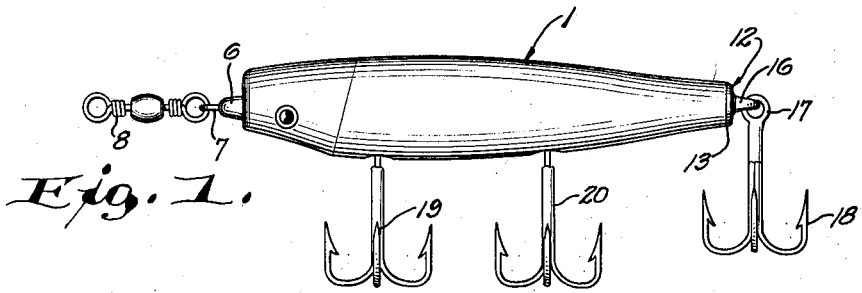
Figure 1 is a view in side elevation showing an artificial bait constructed in accordance with the present invention.

Referring to the drawings, and more particularly to Figures 1 to 7 inclusive, it will be seen that in the embodiments of the invention there illustrated the artificial bait comprises a plug or body 1 which may be of any suitable design or shape and colored or ornamented as desired. In the front end of the body there is formed an elongated cylindrical socket 2 which opens out through the front end of the body. The rear end of the body is formed with a similar though shallow socket 3. A slot 4 is formed in the underside of the body and extends longitudinally thereof from one end of the body to the other, the slot intersecting the sockets 2 and 3.

A leader 5, preferably of resilient or spring wire, is disposed in the slot 4 and extends from the socket 2 back to the socket 3. A head 6 is suitably secured to the forward end of the leader wire 5 and may be constructed of a conical piece of lead provided at its forward end with an eye 7 to adapt the same for attachment by means of a suitable swivel or link connection 8 to the fishing line 9. A coil spring 10 encircles the leader wire 5 rearwardly of the head 6 and has its forward end abutting the head and if desired, is connected thereto. The rear end of the spring in the assembly abuts the shoulder 11 presented by the inner end of the socket 2.

A connector designated generally at 12 is pivotally inter-related with the rearward end of the leader wire. This connector 12 has a ring-like body portion 13 adapted to fit snugly in the socket 3 and having a flange 13' adapted to abut flushly against the rear end of the plug or body 1. The ring-like body portion 13 is provided with a curved cross piece 14 interfitted with an eye 15 formed at the rearward end of the leader wire. Integral with and projecting rearwardly from the flange 13' of the connector 12 is an eye or loop 16 with which the eye 17 of a rearward hook 18 interfits.

Figure 2:
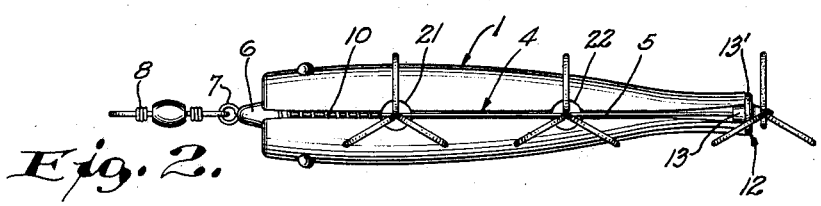
Figure 2 is a view thereof in bottom plan.
Figure 3:
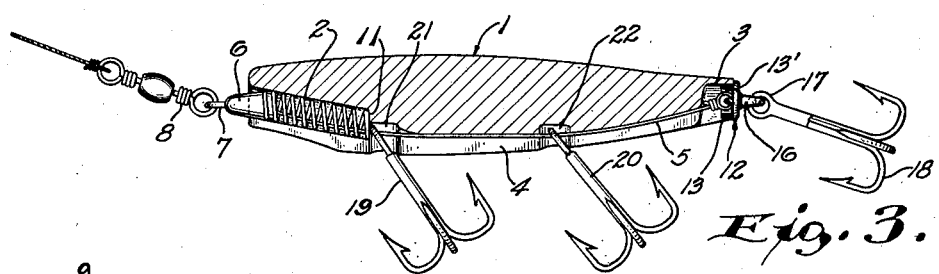
Figure 3 is a view thereof in central vertical longitudinal section showing the parts interrelated as they are before a strike has been made.
Figure 4:
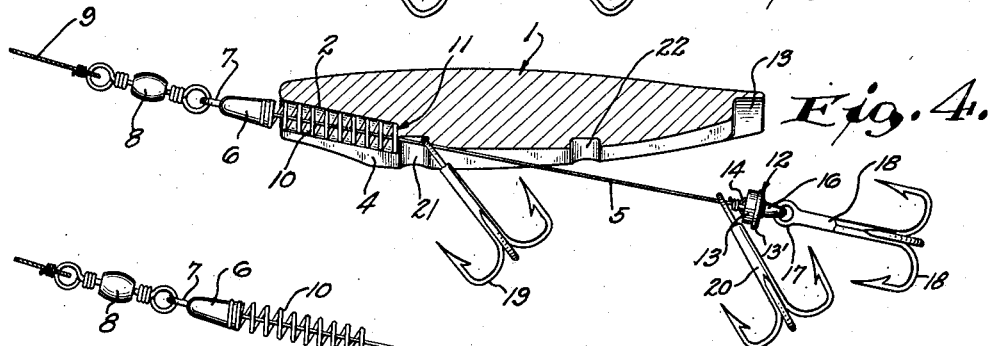
Figure 4 is a similar view showing the action that results upon the occurrence of a strike.
Figure 5:
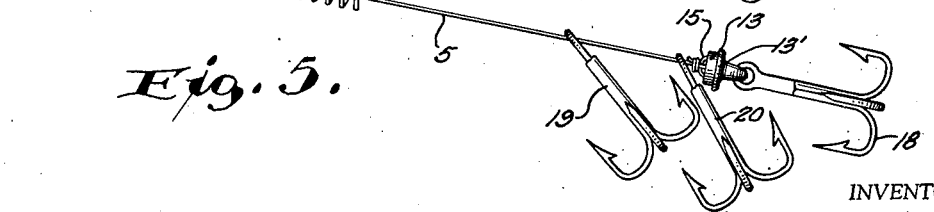
Figure 5 is a view showing the hook tackle completely detached from the plug or body of the bait.

The parts are shown dimensioned and proportioned so that with the spring 10 inserted in the socket 2 it must be compressed to cause the head 6 to enter the forward end of the socket and allow the connector 12 to be interfitted with the socket 3 in the manner illustrated in Figures 1, 2 and 3.

Hooks 19 and 20 are slidably mounted on intermediate portions of the leader wire 5, the eyes of the hooks being simply threaded over the wire. In the assembly the eyes of the hooks are received in notches 21 and 22 provided in the underside of the body or plug of the bait and intersecting the slot 4 thereof as shown.

If either of the hooks 19 or 20 are struck by a fish they are pulled rearwardly along the wire 5 and flex this wire to cause a similar action to ensue although incident to this action the hooks 19 and 20 slide back on the leader wire. Of course, if the hook 20 alone is taken by the fish it will cam directly back to any impact with the connector 12 without immediately disturbing the position of the hook 19, whereas if the hook 19 is struck, it will carry the hook 20 with it during its travel back along the wire 5.

The slidably mounted hooks preclude the possibility present in baits previously proposed and embodying two or more sets of hooks, permanently fixed to the body, of allowing the fish to use the power of his jaws against two separate sets of the hooks and thereby tear the tissue of his mouth sufficiently to make it possible to "throw" or in some other manner become disengaged from the hooks.

When the strike is made, as long as a tight line is maintained between the fish rod and the struggling fish no disengagement of the hook assembly from the body or plug occurs. However, when the fish vigorously shakes his head either in the water or when "breaking" above water on a slack line, the head 6 is caused to compress the spring 10 and the recoil of the spring disengages the plug or body 1 from the lead wire and the hooks thereon. Once the body or plug is disengaged from the hook assembly there is no longer an object present of sufficient weight to be of any assistance to the fish in throwing the hooks.

The construction shown in Figures 6 and 7 varies from that just described only in the provision of a flexible connection 25 between the forward end of the plug or body 1 and the swivel 26 interposed between the leader wire 5' and the fishing line 9 and in the provision of a jointed leader wire 5'. As illustrated to advantage in Figure 7, the leader wire 5' has a front section 5a and a rear section 5b which are interconnected by interfitting or interlooped eyes 27. These eyes are small enough to allow the eyes of the hooks 19 and 20 to pass over them, the hook 20 abutting a half sphere of lead 28 mounted on the rear section of 5b and providing the abutment for the rear socket which has previously been presented by portions of the connector 12.

By having the hooks 19 and 20 slide over the joint 27 when the strike is made they are carried by the freely pivoting short rear section 5b of the leader wire and hence the leader wire is relieved of any serious transverse bending strain.

The artificial plug or bait shown in Figures 8 to 10 is of the reversible type which may be selectively employed for either surface fishing or deep diving. In this form of the invention the body or plug of the bait is formed with the bottom and rear sockets 2 and 3 and longitudinal slot 4 as before and the leader wire 5 with its head 6, connector 12, spring 10 and hooks 18, 19 and 20 may be related therewith and with the fish line in the manner heretofore described. The forward end of the body of the bait is angled downwardly and forwardly as indicated at 30 and provided with similarly disposed vanes 31 attached to the front of the bait by screws 32. When used in the position shown in Figure 8, the bait is adapted for deep diving. In order to permit this bait to be reversed or turned over it is formed with a second slot 35 opposite the first slot and has notches 36 and 37 intersecting the slot 35 and opposite the notches 21 and 22. When the leader wire 5 is extended through the slot 35 the bait is used in the mannner illustrated in Figure 9 wherein it is adapted as a surface bait. Obviously the type of leader wire shown in Figure 7 may be employed with this form of the invention if desired.

The construction shown in Figure 11 is identical with that shown in Figures 1 to 5 inclusive save that the plug or body designated generally at 40 does not have a socket at its rear end but in lieu of the socket is provided with a rearwardly projecting pin or peg 41, a portion of which is driven into or suitably secured into the material of the body. The leader wire, designated at 42, corresponds to the leader wire 5 and is interconnected with the forward end of the body in the manner shown in Figures 1 to 5 and also to the fishing line in the same way as illustrated in these figures. At its rearward end it is provided with a loop or eye 43 which is interconnected with the eye 44 of the rear fish hook 45. A ring 46 is interconnected or interfitted with the eye 43 and is designed to be engaged over the peg 41 when the spring 10 is compressed and the hook assembly and leader wire and plug or body are assembled. With this construction the hooks forwardly of the rear hook 45 are permitted to slide to the rearmost extremities of the leader wire without affecting the disengagement of the leader wire and the hook assembly from the body. Actual disengagement of the hooks and leader wire from the plug or body will only follow from action such as that previously described and incidental to the vigorous shaking of the plug or body by the head of the fish.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. An artificial bait comprising a body having outwardly opening sockets at its ends and provided with a slot extending longitudinally of the body from one end thereof to the other, said slot opening downwardly and intersecting the sockets at its ends, a leader wire having its intermediate portion disposed in said slot and its end portions disposed in said sockets, a head connected to the front end of the leader wire, a fishing line connected to said head, a coil spring between the head and the inner end of the socket at the front of the body, a connector secured to the rear end of the leader wire and interfittable with the socket at the rear of the body a hook connected to the connector, and hooks mounted on intermediate portions of the leader wire, said body having notches intersecting the slots and receiving the eyes of said last named hooks.

2. An artificial bait of the character described comprising a body having sockets at its ends and provided with a slot connecting said sockets, a leader wire extending through the slot and sockets, a detachable, yieldable connection between the forward socket and the forward end of the leader wire, a fishing line connected to the forward end of the leader wire, a connector detachably interfittable with the rearward socket, a hook connected to said connector, and a hook slidably mounted on an intermediate portion of the leader wire.

3. An artificial bait of the character described comprising a body having a slot on its underside, a leader wire extending through the slot, a fishing line connected to the forward end of the leader wire, a yieldable detachable connection between the forward end of the leader wire and the forward end of the body, a detachable connection between the rearward end of the leader wire and the rearward end of the body, and hooks mounted on the leader wire.

4. An artificial bait of the character described comprising a body, a leader wire extending lengthwise of the body, a detachable connection between the rearward end of the leader wire and the rearward end of the body, said leader wire swinging freely away from said body when said connection is detached, a connection between the forward end of the leader wire and the forward end of the body and including a spring for maintaining the connection between the rearward end of the leader wire and the rearward end of the body, a fishing line connected to the leader wire, and hooks connected with the leader wire.

5. A reversible fishing bait of the character described comprising a body having a forward end provided with vanes projecting laterally from one side of the body, said body having sockets at its front and rear end being provided with upper and lower slots extending from one of the sockets to the other, a leader wire selectively positioned in said slots, and means for detachably connecting the ends of the leader wire with the sockets at the front and rear of the body, and hooks carried by said leader wire.

6. An artificial bait of the character described comprising a body having sockets at its ends and provided with a slot connecting the sockets, an opening through the surface of the body, a leader wire including a plurality of sections, and means jointly interconnecting the sections, means for detachably connecting the ends of the leader wire to the sockets of the body, and hooks slidable over the means connecting the sections thereof so as to be disposed on the rearward section of the leader wire upon the occurrence of a strike.

7. An artificial bait of the character described comprising a body having sockets at its ends and provided with a slot extending lengthwise thereof and intersecting the sockets, a leader wire extending through the slot and sockets, a connector secured to the rearward end of the leader wire and interfittable with the socket at the rear end of the body, a hook interfitted with said connector, a head secured to the forward end of the leader wire and disposed with the socket at the forward end of the body, a coil spring interposed between the head and the bottom of the socket at the forward end of the body, and a fishing line connected to said head.

8. An artificial bait of the character described comprising a body having sockets at its ends and provided with a slot extending lengthwise thereof and intersecting the sockets, a leader wire extending through the slot and sockets, a connector secured to the rearward end of the leader wire and interfittable with the socket at the rear end of the body, a hook interfitted with said connector, a head secured to the forward end of the leader wire and disposed within the socket at the forward end of the body, a coil spring interposed between the head and the bottom of the socket at the forward end of the body, and a fishing line connected to said head in combination with means for flexibly interconnecting the fishing line and the body.

9. An artificial bait of the character described comprising a body, a leader wire extending lengthwise of the body, means for flexibly and detachably connecting the ends of the leader wire to the ends of the body, a fishing line connected to the leader wire and hooks slidably mounted on the leader wire and effective when pulled to disconnect the leader wire from the body.

10. An artificial bait of the character described comprising a plug, a leader extending lengthwise of the plug, a detachable connection between the rearward end of the leader and the rearward end of the plug, a detachable connection between the forward end of the leader and the forward end of the plug and including a spring for maintaining both of said connections, said leader and plug being separable and freely shiftable with respect to each other when said connections are detached, a fishing line connected to the leader, and hooks mounted on the leader and effective when pulled to flex the spring to automatically detach said connections.

11. An artificial bait of the character described comprising a plug, a leader extending lengthwise of the plug, a detachable connection between the rearward end of the leader and the rearward end of the plug, a detachable connection between the forward end of the leader and the forward end of the plug, and including a spring for maintaining both of said connections, said leader and plug being separable and freely shiftable with respect to each other when said connections are detached, a fishing line connected to the leader, and hooks mounted on the leader and effective when pulled to flex the spring to automatically detach said connections, in combination with a flexible connection between the fishing line and the plug providing for separation of the plug from the leader but retaining the connection between the line and the plug.

12. An artificial bait of the character described comprising a plug, a leader made up of a long front section and a short rear section and a joint flexibly interconnecting said sections, means for detachably connecting the leader to the plug, and hooks mounted on the leader, the hooks mounted on the forward section of the leader being slidable over the joint onto the rear section of the leader upon the occurrence of a strike to relieve the leader of excessive transverse bending strains, and a fishing line connected to the leader.

13. An artificial bait of the character described comprising a body, a leader wire extending lengthwise of the body, means for flexibly and detachably connecting the forward end of the leader wire to the forward end of the body, the rearward end of the body having a rearwardly projecting pin, a ring interconnected with the leader wire and adapted to be detachably fitted over the pin, and hooks connected to the leader wire, the hooks forwardly of the rearward end of the leader wire being freely slidable to the rear end thereof when said ring is detached from said pin.

14. An artificial bait of the character described comprising a plug, a leader wire extending lengthwise of the plug, hooks associated with the leader wire, certain of said hooks being slidable therealong, a detachable connection between the rearward end of the leader wire and the rearward end of the plug including a projection from the rearward end of the plug and a member connected with the leader wire and detachably embracing said projection, a detachable connection between the forward end of the leader wire and the forward end of the plug including a spring and releasably intensioning both of said connections, and a fish line connected to the leader wire.

CLARENCE L. GOLDAMMER.